US011678292B2

(12) United States Patent
Rahman

(10) Patent No.: US 11,678,292 B2
(45) Date of Patent: Jun. 13, 2023

(54) LOCATION REPORTING IN A WIRELESS TELECOMMUNICATIONS NETWORK, SUCH AS FOR LIVE BROADCAST DATA STREAMING

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 7 days.

(21) Appl. No.: 16/913,956

(22) Filed: Jun. 26, 2020

(65) Prior Publication Data
US 2021/0410099 A1 Dec. 30, 2021

(51) Int. Cl.
*H04W 4/029* (2018.01)
*H04W 64/00* (2009.01)
*H04L 43/028* (2022.01)
*H04W 36/32* (2009.01)
*H04W 76/11* (2018.01)
*H04W 4/06* (2009.01)

(52) U.S. Cl.
CPC ........ *H04W 64/003* (2013.01); *H04L 43/028* (2013.01); *H04W 4/029* (2018.02); *H04W 4/06* (2013.01); *H04W 36/32* (2013.01); *H04W 76/11* (2018.02)

(58) Field of Classification Search
None
See application file for complete search history.

(56) References Cited

U.S. PATENT DOCUMENTS

| 7,088,997 | B1 | 8/2006 | Boehmke |
| 7,958,542 | B2 | 6/2011 | Herrmann |
| 7,966,634 | B2 | 6/2011 | Hoppe et al. |
| 8,095,151 | B2 | 1/2012 | Kall et al. |
| 8,412,772 | B1 | 4/2013 | Nguyen et al. |
| 8,423,658 | B2 | 4/2013 | Shatsky |
| 8,755,802 | B1 | 6/2014 | Butala et al. |
| 9,210,639 | B2 | 12/2015 | Nenner |
| 9,531,993 | B1 * | 12/2016 | Wiseman ........... H04N 21/4722 |
| 9,686,729 | B2 | 6/2017 | Zingler |
| 9,736,314 | B2 | 8/2017 | Charugundla et al. |
| 9,769,228 | B2 | 9/2017 | Bi et al. |
| 9,769,795 | B2 | 9/2017 | Mcevilly |
| 10,123,226 | B2 | 11/2018 | Gupta et al. |
| 10,397,292 | B2 | 8/2019 | Grab et al. |

(Continued)

FOREIGN PATENT DOCUMENTS

KR 20140008596 A 1/2014

OTHER PUBLICATIONS

International Searching Authority, International Search Report and Written Opinion, PCT Patent Application PCT/US2021/038299, dated Sep. 17, 2021, 13 pages.

*Primary Examiner* — German Viana Di Prisco
(74) *Attorney, Agent, or Firm* — Perkins Coie LLP

(57) ABSTRACT

Systems and methods for deriving and providing mobile device locations are disclosed. The method includes a communication network detecting one or more triggering conditions. Based on the triggering conditions, the network may derive a current location of the mobile device. The current location may be sent to the mobile device and/or another device communicating with the mobile device.

20 Claims, 4 Drawing Sheets

(56) References Cited

U.S. PATENT DOCUMENTS

| | | |
|---|---|---|
| 10,602,562 B2 | 3/2020 | Antsev et al. |
| 10,791,050 B2 * | 9/2020 | Varney ............... H04L 41/50 |
| 11,218,779 B2 * | 1/2022 | Prasad ............... H04W 4/06 |
| 2003/0216144 A1 | 11/2003 | Roese et al. |
| 2005/0148325 A1 | 7/2005 | Kopra et al. |
| 2006/0271560 A1 | 11/2006 | Mitchell |
| 2007/0005795 A1 | 1/2007 | Gonzalez |
| 2008/0039096 A1 | 2/2008 | Forsberg |
| 2008/0153461 A1 * | 6/2008 | Chan ............... H04W 4/029 |
| | | 707/E17.11 |
| 2008/0207223 A1 | 8/2008 | Kall et al. |
| 2011/0022471 A1 * | 1/2011 | Brueck ............... G06Q 30/02 |
| | | 705/14.61 |
| 2011/0075675 A1 | 3/2011 | Koodli et al. |
| 2011/0128961 A1 | 6/2011 | Brooks et al. |
| 2011/0307624 A1 | 12/2011 | Shatsky |
| 2012/0099514 A1 | 4/2012 | Bianchetti et al. |
| 2012/0258708 A1 | 10/2012 | Carter et al. |
| 2013/0144716 A1 * | 6/2013 | Xiong ............... H04N 21/25808 |
| | | 705/14.52 |
| 2013/0276035 A1 * | 10/2013 | Walker ............... H04N 21/8456 |
| | | 725/62 |
| 2013/0298170 A1 * | 11/2013 | ElArabawy ............... H04L 47/30 |
| | | 725/62 |
| 2013/0301466 A1 | 11/2013 | Nenner |
| 2014/0179323 A1 | 6/2014 | Butala et al. |
| 2015/0350358 A1 | 12/2015 | Nguyen et al. |
| 2017/0164372 A1 | 6/2017 | Gupta et al. |
| 2017/0324836 A1 | 11/2017 | Lisewski et al. |
| 2017/0374116 A1 * | 12/2017 | Phillips ............... H04L 65/764 |
| 2018/0109911 A1 | 4/2018 | Chandramouli et al. |
| 2019/0014613 A1 | 1/2019 | Antsev et al. |
| 2019/0069125 A1 * | 2/2019 | Ravichandran ..... H04L 67/2842 |
| 2019/0340438 A1 * | 11/2019 | Leung ............... G06K 9/00744 |
| 2020/0359095 A1 * | 11/2020 | Ziskind ............... H04N 21/4621 |

* cited by examiner

2

LOCATION REPORTING IN A WIRELESS TELECOMMUNICATIONS NETWORK, SUCH AS FOR LIVE BROADCAST DATA STREAMING

BACKGROUND

Rapid growth in computing technology is creating greater demand for data communication. Some mobile devices and applications require high-bandwidth communications, such as for watching streaming content in ultra-high definition. Further, users demand personally-relevant information/content in real-time, such as for augmented reality applications. However, the amount of available network resources may be limited in supporting the growing demand.

Figure 1:
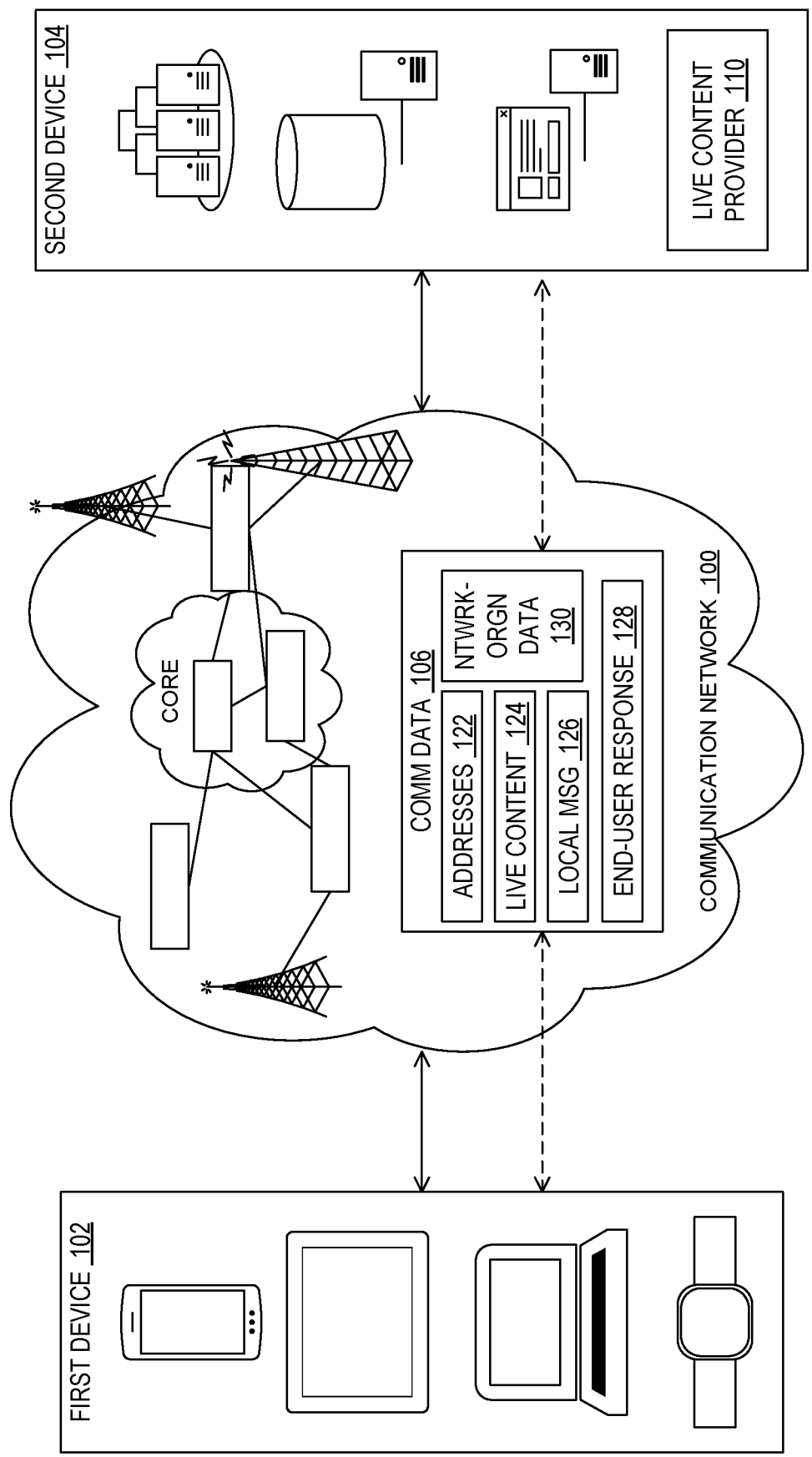
FIG. 1 illustrates a communication network in which some implementations of the present technology can be utilized.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

A mobile communication network (e.g., a cellular communication network) can facilitate data transfers between end-user devices, such as between a mobile personal device (e.g., a User Equipment (UE)) and a service provider device (e.g., a server). The mobile communication network (the "network") can transfer data to and from the end-user devices for a variety of different applications/uses, such as for audio/video communications and/or localized (e.g., location-specific) communications. As an example, the network can transfer data that allows an end-user to watch live content (e.g., real-time broadcasts, such as for sporting events) provided by a content provider. Also, the network can transfer data that provides location-relevant messages (e.g., advertisement and/or search results) associated with the user's current location.

In conventional communication systems/networks, location of the end-user device is determined at (using, e.g., Global Positioning System (GPS) data) the end-user device. Accordingly, the end-user device reports its location to the content provider (i.e., corresponding communication endpoint), and the content provider sends back information relevant to the reported location. The conventional systems/networks typically facilitate the data exchange without actively participating in the location determination and/or usage thereof.

In contrast, implementations of the present technology permit the network to detect one or more triggering conditions for identifying certain types of communications, and in response, deriving/estimating the current location of the end-user mobile device. The network (i.e., instead of the mobile device) can derive the current location of the mobile device by identifying a region/location of a serving-cell and/or a corresponding access point (e.g., base station). In some implementations, the network can derive in real-time (i.e., in direct response to the detection of the triggering conditions) the current location of the mobile device, such as via base station triangulation/trilateration. The network can provide the derived location directly to an end-user device (e.g., a service/content provider server) communicating with the mobile device, such as by acting as a proxy to the service/content provider server. Alternatively or additionally, the network can provide the derived location to the end-user device via the mobile device. In other words, the network can provide the derived location to the mobile device, which can report the received location to the end-user device according to a predetermined process/protocol.

As an illustrative example, a cellular communication network can derive a current location of the UE and provide it to a content server communicating with the UE. The current location can be communicated so that the content server can identify and send location-relevant content (e.g., notifications or advertisements related to entities nearby or within a threshold distance from the current location) to the UE. In some implementations, the cellular network can trigger the location derivation based on analyzing the communicated information, such as by analyzing associated metadata (e.g., consumed bandwidth and/or endpoint addresses) and/or the communicated content (via, e.g., Deep Packet Inspection (DPI)). For example, the network can derive and provide the real-time information of the UE for applications that consume relatively large amounts of processing resources for the UE and/or relatively large amounts of the communication and network resources (e.g., bandwidth), such as for providing real-time video content (e.g., live broadcasts). Thus, the network can alleviate the processing burden of the UE while enabling real-time location-specific features (i.e., features relevant to real-time context) for the end-user of the UE.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Suitable Environment

FIG. 1 illustrates a communication network 100 (also referred to herein as network 100) in accordance with various implementations or embodiments. The communication network 100 can communicatively couple devices, such as a first device 102 and a second device 104. The first device 102 and the second device 104 can correspond to communication end-points. As an illustrative example, the first device 102 can include a mobile device, such as a mobile phone, a telecommunications transceiver in a vehicle, a tablet computer, a laptop computer, and/or a wearable device (e.g., a smart watch, augmented-reality (AR) glasses, virtual-reality (VR) glasses, etc.). Alternatively or additionally, the first device 102 may include other types of devices, such as a workstation and/or an Internet of Things (IoT) device. Also, as an illustrative example, the second device 104 can include a service/content provider device, such as a server. Alternatively or additionally, the second device 104 may include other types of devices, such as a mobile device.

The network 100 may include access nodes configured to serve as hubs that function as gateways for the network 100. Some examples of the access node can include a Radio Access Network (RAN) Node (e.g., an Evolved-Universal Terrestrial Radio Access Network (E-UTRAN) Node B (eNode B or eNB), a Radio Network Controller (RNCs) in an E-UTRAN, and/or a next generation Node B (gNB)). The access node may also include a base station, a Wireless Fidelity (WiFi) router, a modem, and/or other network gateway devices. The access nodes can be configured to communicate with the first device 102 according to one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communication technologies.

In general, the network 100 can include multiple cells, with each cell including one or more BSs (macro cell), 5G transceivers (including small cell devices), or a combination of both macro and small cells (HetNets), though many other cell types are possible including cells having one or more femtocells, picocells, IEEE 802.11 access points (WiFi APs), and the like. Depending on the configuration and size, the network 100 can represent and serve various regional areas, for example, one or more rooms, one or more blocks, a city, a state, an entire nation, the whole world, etc.

The network 100 can provide a wireless communicative connection between the access node and the first device 102 according to one or more wireless communication standards/protocols as described above. The network 100 can include network nodes communicatively coupled to the access nodes and configured to process and/or route information to/from the first device 102 to counterpart communication endpoints (e.g., service providers, content/service servers, and/or other end-user devices). The access nodes can be communicatively coupled (for example, using a backhaul connection) to backhaul equipment, for example, an operation support subsystem (OSS) server, a radio network controller (RNC), etc. Some examples of the network nodes can include a mobility management entity (MME), a serving gateway (SGW), and/or a package data network (PDN) gateway (PGW). Additionally or alternatively, the network nodes can include Network Functions (NFs). A grouping of the network nodes can form a core network that is configured to function as a backbone portion of the network 100. For example, the core network can include components configured to implement wireless communications, such as cellular communication networks and/or wireless fidelity networks. The core network can be connected to different parts of the network 100, such as the Internet and/or telephone networks. Accordingly, the core network can establish/facilitate communication sessions for exchanging data between communication endpoints (e.g., end-user devices and/or service provider servers). In some implementations, the core network can include an IP Multimedia Core Network Subsystem (IMS).

The network 100 can use the network nodes and/or the access to nodes to communicate communication data 106 between the communication endpoints (e.g., between the first device 102 and the second device 104). The communication data 106 can include payload information (e.g., digitalized/quantized representations of content, such as sounds, images, values, etc.) and/or other session information. The communication data 106 can include one or more data packets (e.g., individual units of information) that each include the payload information and the session information. For example, the communication data 106 can include addresses 122 that represent at least the devices serving as the communication endpoints (e.g., a source and a destination for the communicated data). Also, for example, the communication data 106 can include other information describing the payload, such as a payload size, a duration, a type of communication, a bandwidth requirement, or the like.

As an illustrative example, the network 100 can facilitate the exchange of communication data 106 between a UE (e.g., the first device 102) and a live content provider 110 (e.g., a server maintained by a broadcast service). Accordingly, the communication data 106 can correspond to live content 124 that depict or represent events or occurrences occurring in real-time (e.g., live broadcasts of concerts, news events, personal content, and/or sporting events). As such, the payload information of the live content 124 can correspond to image(s) and/or sound(s) of the real-time events or occurrences. The communication data 106 for the live content 124 can also include the address 122 of the first device 102 (e.g., the UE) displaying/outputting/consuming the representations of the real-time events and/or the address 122 of the second device 104 providing the representations of the real-time events. In other words, the second device 104 can send the payload information corresponding to the live content 124 to the first device 102, and the communication data 106 can include the addresses 122 that identify the corresponding sender/receiver devices.

The network 100 can enable one or more communicating endpoints to send/receive localized messages 126. The localized messages 126 can include content (e.g., advertisements, search results, and/or queries) associated with geographic locations (e.g., a real-time current location estimate) of the UEs. For example, the localized message 126 can include an advertisement for an entity located within a threshold distance from a current real-time location of the UE receiving/consuming the content.

The communication data 106 can also include end-user responses 128. The end-user responses 128 can correspond to messages sent from content-consumer devices (e.g., the first device 102) to content-provider devices (e.g., the second device 104). For example, the end-user responses 128 can include acknowledgements, status reports, and/or other protocol-based communications associated with receiving the content data. The end-user responses 128 can be used to send network-originated data 130 (e.g., the current real-time locations of the consuming UEs) to the content providers.

As an illustrative example, the network 100 can detect one or more triggering conditions based on the communication data 106, and in response, derive the network-originated data 130 including the geographic location of the UE associated with the communication data 106. The network 100 can provide the network-originated data 130 (e.g., the derived real-time location estimate) to the first device 102 and/or the second device 104. The network 100 can send the network-originated data 130 to the first device 102, and the first device 102 can send the network-originated data 130 to the second device 104 to report the UE's current location. Alternatively or additionally, the network 100 can send the network-originated data 130 directly to the second device 104, thereby functioning as a proxy of the second device 104. Based on the derived location, the second device 104 (e.g., the content provider) can identify and send to the UE the localized message 126 that includes advertisement for entities within a threshold distance from the derived location.

Operating Details

Figure 2:
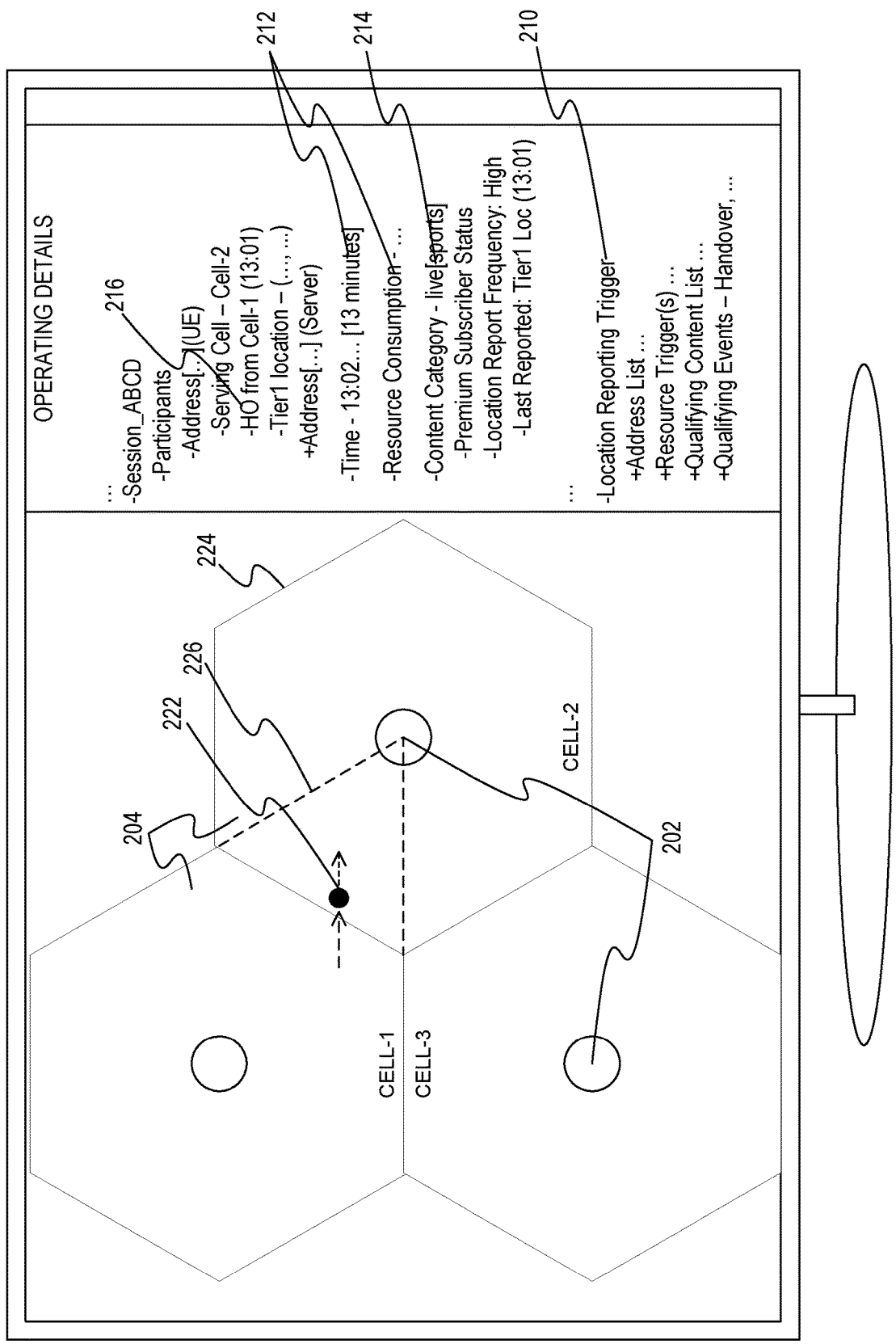
FIG. 2 illustrates example operating details in accordance with one or more implementations of the present technology.

FIG. 2 illustrates example operating details in accordance with one or more implementations of the present technology. As an illustrative example, FIG. 2 shows the operating details displayed on a screen, such as for maintaining or reviewing statuses of the network 100 or portions thereof.

As described above, the network 100 can include and/or interact with access nodes 202 configured to serve as hubs that function as gateways for the network 100. Each access node 202 can correspond to a service region 204 (e.g., a geographic area serviced by the access node 202). The service region 204 can correspond to an area in which a mobile device may be able to communicate/connect with the corresponding access node 202. For example, the service region 204 can correspond to a cell, and the access node 202 can correspond to a base station serving the cell.

Other example operating details of the network 100 may include location reporting trigger 210. The location reporting trigger 210 can include conditions or corresponding measurements/parameters configured to initiate a location derivation process for the network 100. For example, the location reporting trigger 210 can include threshold values for session information 212. The location reporting trigger 210 can include a list of the addresses 122 of FIG. 1 corresponding to servers/content providers that utilize the real-time geographic location of the mobile devices receiving or consuming the provided content.

The network 100 can initiate the location derivation process when the address 122 matches one of the addresses on such list. Additionally or alternatively, the location reporting trigger 210 can include a threshold bandwidth or duration for the communication session. Accordingly, the network 100 can initiate the location derivation process when the session satisfies the threshold bandwidth or duration. The location reporting trigger 210 can further correspond to scheduled broadcast times, related keywords/descriptions, and/or other publicly available descriptions of the content associated with the address 122.

In some implementations, the network 100 can utilize the location reporting trigger 210 configured to initiate one or more verification processes leading up to the location derivation process. For example, the network 100 can initiate a process to analyze the content/payload of the communication data 106 (e.g., Deep Packet Inspection (DPI)) when the communication session and/or the corresponding communication data 106 include the matching address, satisfy bandwidth/duration thresholds, and/or correspond to publicly available description of triggering events as described above. The network 100 can initiate the location derivation process when the analysis identifies qualifying content (e.g., the live content 124 of FIG. 1).

Additionally or alternatively, the network 100 can utilize the location reporting trigger 210 associated with handover events 216. The handover events 216 can correspond to changes or transitions in the access nodes 202 serving or connected to the UEs. For example, a mobile device may move from a first service region (Cell-1) toward a second service region (Cell-2) as illustrated in FIG. 2. As the UE moves, the UE will observe changes in strengths/qualities of signals (e.g., reference signals from base stations) associated the Cell-1 and the Cell-2. When the measured strengths/qualities satisfy predetermined conditions, the UE and the base stations can interact with each other to coordinate a change in the serving cell/base station. In response, the network 100 can implement the handover event 216. Accordingly, the base station for Cell-1 can stop servicing the UE, and the base station for Cell-2 can begin servicing the UE. The location reporting trigger 210 may be configured to initiate the location derivation process based on the handover event 216. In other words, the network 100 can derive the real-time geographic location of the UE when the serving cell changes for the UE (e.g., when the handover event 216 occurs).

In deriving the real-time geographic location of the first device 102, the network 100 can generate one or more estimates associated with different granularities/accuracies. For example, the network 100 can generate a first location estimate 222 that represents the real-time geographic location of the first device 102 with higher-level accuracy. For example, the first location estimate 222 can include location information (e.g., coordinate values) having an accuracy sufficient to satisfy Enhanced 911 (e911) requirements (e.g., within meters of the actual location). The network 100 may derive the first location estimate 222 using finer-grained locating techniques, such as cell-tower triangulation/trilateration. Alternatively or additionally, the network 100 can generate a second location estimate 224 that represents the real-time geographic location of the first device 102 with lower-level accuracy. The second location estimate 224 can have an accuracy or a granularity that corresponds greater distances/areas than the first location estimate 222. For example, the second location estimate 224 can be within 100 meters or within kilometers from the actual location. Also, the second location estimate 224 can represent the location of the UE according to a neighborhood, a city, a zip code, and/or other areas larger than a city block. In some implementations, the second location estimate 224 can correspond to the service region 204 (e.g., cell site) of the service access node. Accordingly, the network 100 can use a Cell Global Identity (CGI) for the corresponding service region 204 as the second location estimate 224. Alternatively or additionally, the network 100 can generate an intermediate location estimate 226 having intermediate accuracy/granularity relative to the first location estimate 222 and the second location estimate 224. For example, the intermediate location estimate 226 can represent one or more regions/sectors within the service region (e.g., cell-site). The network 100 can determine the intermediate location estimate 226 based on a direction associated with one or more antennas used to wirelessly connect to the UE, such as for beamforming.

Control Flow

Figure 3:
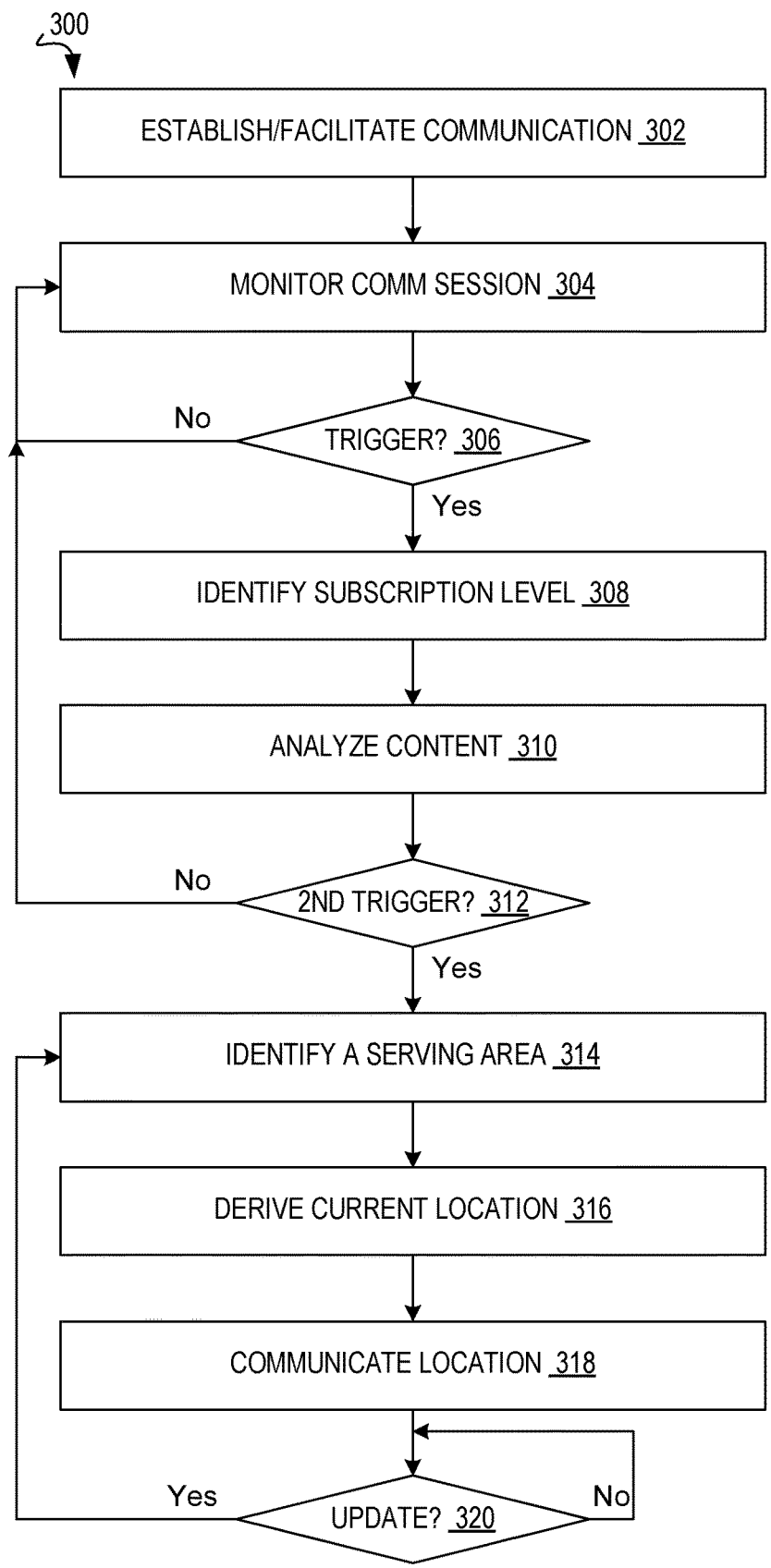
FIG. 3 is a flow diagram illustrating an example method for reporting location information in accordance with one or more implementations of the present technology.

FIG. 3 is a flow diagram illustrating an example method 300 for reporting location information in accordance with one or more implementations of the present technology. The method 300 can be for operating the network 100 of FIG. 1 to derive the location of the first device 102 of FIG. 1 (e.g., a UE) and/or provide the derived location to the second device 104 of FIG. 1 (e.g., a content/service provider server). The method 300 may be implemented using one or more network nodes and/or the access nodes 202 of FIG. 2.

At block 302, the network 100 can establish and facilitate communications between the first device 102 of FIG. 1 (e.g., a UE) and the second device 104 of FIG. 1 (e.g., a server). For example, the network 100 can establish a wireless connection with the UE according to one or more communication protocols. Based on the wireless connection, the UE and/or the server can transmit signals intended for a communication counterpart. The network 100 can facilitate exchange of the communication data 106 of FIG. 1 corresponding to the exchanged content (e.g., the live content 124, the localized messages 126, and/or end-user responses 128 illustrated in FIG. 1) and/or other associated information (e.g., the session information 212 of FIG. 2, such as the addresses 122 of FIG. 1).

To facilitate the communication, the network 100 can identify the addresses 122 associated with the communication data 106, such as by inspecting one or more packets communicated through/across the network 100. In other words, the network 100 can identify the second device 104 (e.g., a content provider server) and the first device 102 (e.g., the UE consuming the provided content) connected to and connecting through the network 100.

At block 304, the network 100 can monitor one or more aspects of the communication session. The network 100 can perform an initial analysis for one or more of the packets exchanged between the first device 102 and the second device 104. For example, the network 100 can analyze the metadata and/or non-payload portion of the communication data 106, such as the addresses 122, the communication duration, the number/size of the packets, etc. The network 100 may remain blind to a content of the one or more packets (e.g., the payload portion) before and/or during the monitoring (e.g., the initial inspection).

At decision block 306, the network 100 can determine whether the monitored aspect should trigger the process for the network 100 to derive the real-time location of the first device 102 (e.g., the UE). The network 100 can compare the monitored session information 212 to the location reporting trigger 210 of FIG. 2. The network 100 can continue to monitor the communications without triggering the location derivation when the monitored session information 212 fails to satisfy the location reporting trigger 210. In some implementations, the network 100 can perform the comparison of the monitored data to the triggering conditions according to a predetermined frequency/duration. Additionally or alternatively, the network 100 can trigger the real-time location derivation based on customized rating within the same/different network. For example, the network 100 can trigger the real-time location derivation when a customer's device is active in a different/new area, such as during a travel or after relocation.

When the monitored session information 212 satisfies the location reporting trigger 210 (e.g., when the address 122 is on the predetermined list and/or when the bandwidth and/or packet size/quantity exceeds a threshold), the network 100 can trigger the location derivation process. At block 308, the network 100 may identify subscription level(s) of one or more of the communicating parties. The network 100 can provide different subscription/service levels associated with the location derivation process. The network 100 may derive and provide the first location estimate 222 of FIG. 2 (e.g., a higher-accuracy or a finer granularity estimate) for a more premium or a higher-level subscription. The network 100 may derive and provide the second location estimate 224 of FIG. 2 (e.g., a lower-accuracy estimate) for a lower-level subscription. In some implementations, the network 100 can derive and provide the intermediate location estimate 226 of FIG. 2. Accordingly, the network 100 can provide the estimates based on the subscription level associated with one or more of the communicating parties.

At block 310, the network 100 may analyze the content of the communication data 106. The network 100 can inspect the content when the session information 212 satisfies the initial set of triggers. The network 100 may implement the DPI, for example, to analyze the content of the communication data 106. Accordingly, the network 100 can generate the content estimation 214 of FIG. 2 based on analyzing the content.

At decision block 312, the network 100 may determine whether the result of the content analysis satisfies one or more corresponding trigger conditions. For example, the network 100 can identify whether the communication data 106 corresponds to one of the predetermined categories (e.g., the live content 124). When the communicated content does not satisfy the content-based triggering conditions, the network 100 can continue to monitor the communication session as described above for block 304.

When the communicated content satisfies the content-based triggering conditions, the network 100 can identify a serving area for the first device 102. For example, the network 100 can identify the service region 204 (e.g., the cell-site) connected to the first device 102. The network 100 may identify the serving area based on determining the communication data 106 as a live-broadcast stream. The network 100 can identify the service region 204 for, or as part of, deriving the real-time location of the UE consuming the communicated content. In some implementations, the network 100 can generate CGI based on identifying the service region 204 associated with the base station connected to/serving the UE.

At block 316, the network 100 can derive a current location (e.g., a real-time location) of the first device 102 consuming the content. The network 100 can derive the current location (e.g., the first location estimate 222 and/or the second location estimate 224) based on or located in the serving area. For example, the network 100 can derive the current location to include the second location estimate 224 (e.g., the CGI). Also, the network 100 can derive the current location to include the first location estimate 222 (e.g., a higher-level accuracy data) associated with the more premium subscription level of one or more of the communicating parties. The network 100 may derive the premium real-time location estimate based on radiolocating the UE using multiple base stations (e.g., according to cell-tower triangulation/trilateration). Accordingly, the network 100 can derive the premium real-time location estimate that represents a location of the UE at a finer granularity than the CGI. For example, the network 100 can derive the first location estimate 222 and/or the intermediate location estimate 226 with accuracy-level or granularity that is between the first location estimate 222 and the second location estimate 224. The intermediate location estimate 226 may be derived as a more premium estimation in comparison to the second location estimate 224. The network 100 may derive the intermediate location estimate 226 based on determining an area or a sector corresponding to a set of angles about the base station associated with the serving cell-site. The network 100 can derive the intermediate location estimate 226 based on determining parameters associated with antenna(s) used to communicate with the UE.

At block 318, the network 100 can communicate the derived location to one or more of the communicating parties (e.g., the first device 102 and/or the second device 104). The network 100 can communicate the derived location as the network-originated data 130 of FIG. 1. The network 100 may communicate the real-time location to the second device 104 for location-based services. For example, the network 100 can provide the real-time location to the content source such that the content provider may provide the localized message 126 of FIG. 2 to the UE.

The network 100 can send the real-time location directly from a network node to the second device 104 (e.g., the content source). Accordingly, the network node can function as a proxy to the content source to permit insertion of location-specific advertisements into the live-broadcast stream for the UE. Alternatively or additionally, the network 100 may send the real-time location through the serving base station to the UE consuming the content. The UE can relay the real-time location from the network 100 to the content provider via the end-user response 128 without the UE actively deriving its own current location.

At decision block 320, the network 100 can determine whether an update to the real-time location is necessary. The network 100 can initiate an update according to a predetermined reporting frequency/interval. The reporting frequency/interval may correspond to the identified subscription level. Additionally or alternatively, the network 100 can adjust the reporting frequency/interval based on the UE location and/or movement information (e.g., previous and/or projected movement direction and/or speed). For example, the network 100 can increase the frequency or shorten the interval between location derivations when the UE is determined to be within a threshold distance from peripheral edges of the service region 204. The network 100 can identify the serving area (block 314) and/or derive the current location (block 316) when the update conditions are satisfied. Accordingly, the network 100 can provide the updated location estimate to the second device 104 (block 318). Otherwise, the network 100 can continue to wait or otherwise monitor the communications for the update conditions.

The network 100 may also initiate the update according to the handover event 216 of FIG. 2. The network 100 can include a monitoring function or an interrupt to detect the handover event 216 for the UE consuming the content. The occurrence of the handover event 216 can satisfy the update conditions and/or override other updating conditions (e.g., reporting interval). In other words, the network 100 may be configured to derive and/or communicate the real-time location of the first device 102 based on detecting the handover event 216 even before the predetermined/scheduled reporting time. Accordingly, the network 100 can derive and/or send the estimate of the real-time location directly in response to the handover event 216 and regardless of a tracked duration since the last-report of the real-time location. The network 100 can reset the tracked duration based on sending the real-time location directly in response to the handover event.

As described above, the network 100 can derive the current location of a mobile device and provide such information to enable location-based services. The network 100 can detect appropriate conditions (via, e.g., one or more of the inspections described above) for deriving and providing the location information. Further, the network 100 can leverage location information integral with operating data (e.g., data produced to facilitate other aspects of the network, such as CGI and/or antenna-related parameters) to provide the real-time location to the content provider. Accordingly, the network 100 can provide the current location of the mobile device with minimal to no additional resource consumption. Further, the network 100 can leverage operational locating methods (e.g., the CGI and/or the e911 mechanisms) with minimal to no additional dedicated circuits or functions. Moreover, the network 100 can use the network-originated data 130 to communicate the location information, thereby reducing the processing load of the mobile device.

As explained above, the present system provides locations of UEs on a cellular network to live-streaming content servers (e.g., live broadcasts of sporting events) for enabling location-specific advertisements. The process can be initiated by the network based on deep packet inspection (DPI). When DPI detects certain content/server ID, the network can identify the serving cell (e.g., CGI) of the corresponding UE. The network can provide the location associated with the serving cell (1) directly to the streaming content server (i.e., with a network node acting as a proxy and sending information to server), or (2) back to the UE so that the UE may provide the location to the server.

The location may be provided according to regular time periods and/or during network events (e.g., handovers).

In some implementations, the network may be configured to provide premium service by providing finer granularity/accuracy for the location information. The network can compare the UE ID and/or the server ID to a subscriber list to identify premium service applicability. Once identified, the network can implement advanced/additional locating protocols (e.g., 911 locating protocol and/or 5G micro-cell location) to derive the finer granularity location information.

The present system distinguishes from 911 protocols at least based on operation triggers and report addresses. Where 911 protocols rely on a set call recipient to trigger the locating process, the present system requires analysis of the actual packet where the recipient is not readily available. Further, 911 protocols have a set recipient for the location information, whereas the present system sends the information back to the UE and/or the server.

The present system also distinguishes from other location-based services since the network does not wait for location requests. As such, the server may acquire the location information faster for real-time/live content (e.g., major sporting events, live-action news feeds, concerts).

Computer

Figure 4:
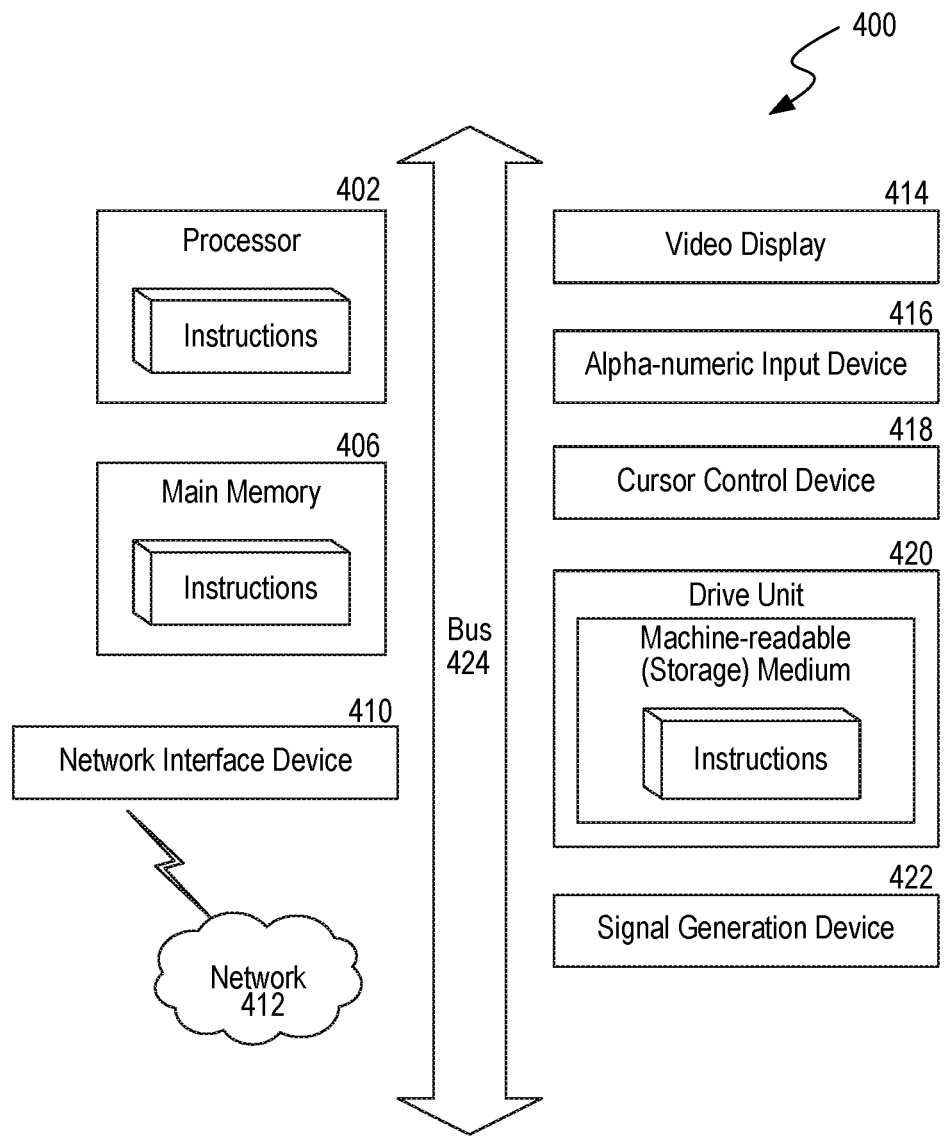
FIG. 4 is a diagrammatic representation of a machine in the example form of a computer system within which a set of instructions, for causing the machine to perform any one or more of the methodologies discussed herein, can be executed.

FIG. 4 is a diagrammatic representation of a machine in the example form of a computer system 400 within which a set of instructions, for causing the machine to perform any one or more of the methodologies or modules discussed herein, can be executed.

In the example of FIG. 4, the computer system 400 includes a processor 402, a memory 406, a drive unit 420 (e.g., a machine-readable storage medium, such as a non-volatile memory), and an interface device 410. Various common components (e.g., cache memory) are omitted for illustrative simplicity. The computer system 400 is intended to illustrate a hardware device on which any of the components described in the example of FIGS. 1-4 (and any other components described in this specification) can be implemented. The computer system 400 can be of any applicable known or convenient type. The components of the computer system 400 can be coupled together via a bus or through some other known or convenient device.

This disclosure contemplates the computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 can include one or more computer systems 400; be unitary or distributed; span multiple locations; span multiple machines; or reside in a cloud, which can include one or more cloud components in one or more networks. Where appropriate, one or more computer systems 400 can perform without substantial spatial or temporal limitation one or more steps of one or more methods described or illustrated herein. As an example and not by way of limitation, one or more computer systems 400 can perform in real-time or in batch mode one or more steps of one or more methods described or illustrated herein. One or more computer systems 400 can perform at different times or at different locations one or more steps of one or more methods described or illustrated herein, where appropriate.

The processor 402 can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor 402.

The memory 406 is coupled to the processor by, for example, a bus 424. The memory 406 can include, by way of example but not limitation, random access memory (RAM), such as dynamic RAM (DRAM) and static RAM (SRAM). The memory 406 can be local, remote, or distributed.

The bus 424 also couples the processor 402 to the drive unit 420. The drive unit 420 can include a non-volatile memory that is often a magnetic floppy or hard disk, a magnetic-optical disk, an optical disc, a read-only memory (ROM), such as a CD-ROM, EPROM, or EEPROM, a magnetic or optical card, or another form of storage for large amounts of data. Some of this data is often written, by a direct memory access process, into memory during execution of software in the computer 400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the drive unit 420. It should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 424 also couples the processor 402 to the network interface device 410. The network interface device 410 can include one or more of a modem or network interface. It will be appreciated that a modem or network interface can be considered to be part of the computer system 400. The network interface device 410 can include an analog modem, ISDN modem, cable modem, token ring interface, satellite transmission interface (e.g., "direct PC"), or other interfaces for coupling a computer system to other computer systems.

The system 400 can include one or more input and/or output devices, such as a video display 414 and/or an alpha-numeric input device 416. The I/O devices can include, by way of example but not limitation, a keyboard, a mouse or other pointing device, disk drives, printers, a scanner, and other input and/or output devices, including a display device. The video display 414 can include, by way of example but not limitation, a cathode ray tube (CRT), liquid crystal display (LCD), or some other applicable known or convenient display device. For simplicity, it is assumed that controllers of any devices not depicted in the example of FIG. 4 reside in the interface.

In operation, the computer system 400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some implementations. The required structure for a variety of these systems will appear from the description below. In addition, the techniques are not described with reference to any particular programming language, and various implementations can thus be implemented using a variety of programming languages.

In alternative implementations, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary implementation to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while implementations have been described in the context of fully functioning computers and computer systems, those skilled in the art will appreciate that the various implementations are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical discs (e.g., Compact Disc Read-Only Memory (CD ROMS), Digital Versatile Discs, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. At least one non-transient, computer-readable medium, carrying instructions that, when executed by at least one data processor, performs a method comprising:
   identifying a content source and a mobile phone based on inspecting one or more packets communicated across a cellular telecommunications network,
      wherein the one or more packets are communicated between the content source and the mobile phone connected to the cellular telecommunications network, and
      wherein the cellular telecommunications network is blind to a content of the one or more packets without the inspection;
   monitoring the one or more packets communicated across the cellular telecommunications network for a first triggering event;
   detecting, in the one or more packets communicated across the cellular telecommunications network, the first triggering event based at least in part on one or more threshold conditions;
   in response to the first triggering event being detected, initiating a performance of a location-derivation process by a cellular network node within the cellular telecommunications network, wherein the location-derivation process includes:
      determining that the one or more packets include a live-broadcast data stream based on at least the inspection of the one or more packets and the first triggering event,
      identifying a particular cellular network node within the cellular telecommunications network that is wirelessly connected to the mobile phone based on the determining of the live-broadcast data stream, and
      deriving a real-time location for the mobile phone based on the particular cellular network node; and
   subsequent to the cellular network node determining the real-time location of the mobile phone based on the cellular network node performing the location-derivation process, communicating the real-time location, by the cellular network node and to the content source, for updating communicated content according to the real-time location of the mobile phone receiving the live-broadcast data stream.

2. The computer-readable medium of claim 1, wherein communicating the real-time location to the content source includes sending the real-time location from the cellular network node as a proxy to the content source to permit insertion of location-specific advertisements into the live-broadcast data stream for the mobile phone.

3. The computer-readable medium of claim 1, wherein communicating the real-time location to the content source includes sending the real-time location through the cellular network node for communicating the real-time location via the mobile phone to the content source.

4. The computer-readable medium of claim 1, wherein communicating the real-time location to the content source includes:
    detecting a handover event representative of a change in serving cellular node for the mobile phone;
    sending the real-time location in response to the handover event and regardless of a tracked duration since a preceding location-reporting event; and
    resetting the tracked duration based on sending the real-time location directly in response to the handover event.

5. The computer-readable medium of claim 1, wherein the method further comprises:
    identifying a subscription level based on the content source, the mobile phone, or both; and
    wherein deriving the real-time location includes deriving a real-time premium location of the mobile phone based on the subscription level,
    wherein the real-time premium location represents a location of the mobile phone at a finer granularity than a service region, and
    wherein the real-time premium location represents an area corresponding to a set of angles about a base station of the cellular network node.

6. The computer-readable medium of claim 5, wherein deriving the real-time premium location includes deriving the real-time premium location based on radiolocating the mobile phone using multiple cellular nodes or base stations.

7. The at least one non-transient, computer-readable medium of claim 1:
    wherein monitoring the one or more packets communicated across the cellular telecommunications network for the first triggering event includes analyzing metadata associated with the one or more packets for the first triggering event, wherein the analyzed metadata includes an address of the mobile phone, an address of the content source, or both;
    wherein detecting the first triggering event is based on comparing the one or more threshold conditions to the analyzed metadata associated with the one or more packets;
    wherein detecting the first triggering event includes identifying the address of the mobile phone, the address of the content source, or both within one or more listings of end users subscribed to the communication of the real-time location; and
    wherein the real-time location is derived and communicated based on detecting the first triggering event.

8. A system comprising:
    one or more processors;
    one or more non-transitory memories coupled to the one or more processors,
        wherein the one or more non-transitory memories include instructions executable by the one or more processors to:
            identify a content source and a user equipment (UE) based on inspecting one or more packets communicated across a telecommunications network, wherein the one or more packets are communicated between the content source and the user equipment connected to the telecommunications network, and the telecommunications network is blind to a content of the one or more packets without the inspection;
            monitor the one or more packets communicated across the telecommunications network for a first triggering event;
            detect, in the one or more packets, the first triggering event based at least in part on one or more threshold conditions;
            in response to the first triggering event being detected, initiate a performance of a location-derivation process by a cellular network node within the telecommunications network, wherein the location-derivation process includes:
                determining a live-broadcast stream based on at least the inspection of the one or more packets, the first triggering event, or both,
                identifying a cell-site connected to the UE based on determining the live-broadcast stream, and
                deriving a real-time location for the UE based on the cell-site; and
            subsequent to the cellular network node determining the real-time location of the UE based on the cellular network node performing the location-derivation process, communicate the real-time location from the cellular network node to the content source for updating communicated content according to the real-time location of the UE consuming the live-broadcast stream.

9. The system of claim 8, wherein the real-time location is communicated based on sending the real-time location from the cellular network node as a proxy to the content source to permit insertion of location-specific advertisements into the live-broadcast stream for the UE.

10. The system of claim 8, wherein the real-time location is communicated based on sending the real-time location through the cell-site for communicating the real-time location via the UE to the content source.

11. The system of claim 8, wherein the real-time location is communicated based on:
    detecting a handover event representative of a change in serving cell-site for the UE; and
    sending the real-time location in response to the handover event.

12. The system of claim 8, wherein the non-transitory memories further include instructions executable by the one or more processors to:
    identify a subscription level based on the content source and/or the user equipment; and
    wherein:
    the real-time location is a real-time premium location of the UE derived based on the subscription level, wherein the real-time premium location represents a location of the UE at a finer granularity than a service region.

13. A method comprising:
    identifying a content source and a user equipment (UE) based on inspecting one or more packets communicated across a telecommunications network,
        wherein the one or more packets are communicated between the content source and the user equipment connected to the telecommunications network, and
        wherein the telecommunications network is blind to a content of the one or more packets without the inspection;
    monitoring the one or more packets communicated across the telecommunications network for a first triggering event;
    detecting, in the one or more packets, the first triggering event based at least in part on one or more threshold conditions;

in response to the first triggering event being detected, initiating a performance of a location-derivation process by a network node within the telecommunications network, wherein the location-derivation process includes:
  determining a live-broadcast stream based on at least the inspection of the one or more packets, the first triggering event, or both,
  identifying a cell-site connected to the UE based on determining the live-broadcast stream, and
  deriving a real-time location for the UE based on the cell-site; and
subsequent to the network node determining the real-time location for the UE based on the network node performing the location-derivation process, communicating the real-time location from the network node to the content source for updating communicated content according to the real-time location of the UE consuming the live-broadcast stream.

14. The method of claim 13, wherein communicating the real-time location to the content source includes sending the real-time location from the network node as a proxy to the content source to permit insertion of location-specific advertisements into the live-broadcast stream for the UE.

15. The method of claim 13, wherein communicating the real-time location to the content source includes sending the real-time location through the cell-site for communicating the real-time location via the UE to the content source.

16. The method of claim 13, wherein communicating the real-time location to the content source includes:
  detecting a handover event representative of a change in serving cell-site for the UE; and
  sending the real-time location in response to the handover event.

17. The method of claim 13, further comprising:
  identifying a subscription level based on the content source and/or the user equipment; and
  wherein deriving the real-time location includes deriving a real-time premium location of the UE based on the subscription level, wherein the real-time premium location represents a location of the UE at a finer granularity than a service region, and
  wherein the real-time premium location represents an area corresponding to a set of angles about a base station of the cell-site.

18. The method of claim 13, further comprising:
identifying a subscription level based on the content source and/or the user equipment; and
wherein:
deriving the real-time location includes deriving a real-time premium location of the UE based on the subscription level, wherein the real-time premium location represents a location of the UE at a finer granularity than a service region.

19. The method of claim 13, further comprising:
identifying a subscription level based on the content source and/or the user equipment; and
  wherein deriving the real-time location includes deriving a real-time premium location of the UE based on the subscription level,
  wherein the real-time premium location represents a location of the UE at a finer granularity than a service region, and
  wherein deriving the real-time premium location includes deriving the real-time premium location based on radiolocating the UE using multiple base stations.

20. The method of claim 13, wherein:
the telecommunications network is a cellular network;
the content source is a live-stream server;
inspecting the one or more packets includes performing deep packet inspection (DPI) on the one or more packets;
the real-time location is associated with a Cell Global Identity (CGI) for the cell-site; and
communicating the real-time location is for inserting location-specific advertisements into the live-broadcast stream for the UE.

* * * * *